US012165172B2

(12) United States Patent
Luttrell et al.

(10) Patent No.: US 12,165,172 B2
(45) Date of Patent: *Dec. 10, 2024

(54) SYSTEMS, METHODS, AND MEDIA FOR DETECTING CONTENT VIEWABILITY

(71) Applicant: Integral Ad Science, Inc., New York, NY (US)

(72) Inventors: David William Luttrell, Philadelphia, PA (US); Micah Freedman, New York, NY (US); Aashi Deacon, Brooklyn, NY (US); Moshe Silberman, Brooklyn, NY (US)

(73) Assignee: Integral Ad Science, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,090

(22) Filed: Dec. 4, 2023

(65) Prior Publication Data

US 2024/0104600 A1    Mar. 28, 2024

Related U.S. Application Data

(63) Continuation of application No. 17/379,699, filed on Jul. 19, 2021, now Pat. No. 11,836,758, which is a continuation of application No. 13/836,700, filed on Mar. 15, 2013, now Pat. No. 11,068,931.

(60) Provisional application No. 61/735,530, filed on Dec. 10, 2012.

(51) Int. Cl.
*G06Q 30/00*     (2023.01)
*G06Q 30/0242*   (2023.01)

(52) U.S. Cl.
CPC ..... *G06Q 30/0246* (2013.01); *G06Q 30/0242* (2013.01)

(58) Field of Classification Search
None
See application file for complete search history.

(56) References Cited

U.S. PATENT DOCUMENTS

| 6,108,637 | A  | 8/2000  | Blumenau |
| 7,567,916 | B1 | 7/2009  | Koeppel et al. |
| 8,364,541 | B2 | 1/2013  | Roth |
| 8,412,683 | B2 | 4/2013  | Baird et al. |
| 9,390,438 | B2 | 7/2016  | Baird et al. |
| 9,865,005 | B1 | 1/2018  | Pottjegort |
| 10,417,300 | B2 | 9/2019 | Artz |
| 2006/0224445 | A1 | 10/2006 | Axe et al. |
| 2008/0243612 | A1 | 10/2008 | Blinnikka |
| 2009/0201772 | A1 | 8/2009  | Billeaudeaux |
| 2009/0265243 | A1 | 10/2009 | Karassner et al. |
| 2010/0088373 | A1 | 4/2010  | Pinkham |

(Continued)

FOREIGN PATENT DOCUMENTS

WO    WO 1998010349    3/1998

OTHER PUBLICATIONS

Lazaris, L., "An Introduction to CSS Keyframes Animation", In Smashing Magazine, May 17, 2011, pp. 1-13.

(Continued)

*Primary Examiner* — Michael Bekerman
(74) *Attorney, Agent, or Firm* — Byrne Poh LLP

(57) ABSTRACT

Systems, methods, and media are disclosed for tracking viewability of content, such as Internet content, by associating a color-changing animated image file with the content and determining, based on whether color of an image is changing, whether the content is in a viewable region of a browser.

19 Claims, 10 Drawing Sheets

(56) References Cited

U.S. PATENT DOCUMENTS

| | | |
|---|---|---|
| 2011/0029393 A1 | 2/2011 | Apprendi et al. |
| 2011/0047006 A1 | 2/2011 | Attenberg et al. |
| 2011/0055023 A1 | 3/2011 | McNeeley et al. |
| 2011/0082755 A1 | 4/2011 | Itzhak |
| 2011/0106634 A1 | 5/2011 | Luttrell et al. |
| 2011/0137733 A1 | 6/2011 | Baird et al. |
| 2011/0137737 A1 | 6/2011 | Baird et al. |
| 2011/0137925 A1 | 6/2011 | Baird et al. |
| 2011/0196747 A1 | 8/2011 | Karidi et al. |
| 2011/0218864 A1 | 9/2011 | Pentz et al. |
| 2012/0010927 A1 | 1/2012 | Attenberg et al. |
| 2012/0159393 A1 | 6/2012 | Sethi |
| 2012/0278162 A1 | 11/2012 | Sun et al. |
| 2012/0303463 A1 | 11/2012 | Stephens et al. |
| 2012/0324098 A1 | 12/2012 | De Jager et al. |
| 2013/0054356 A1 | 2/2013 | Richman et al. |
| 2013/0185164 A1 | 7/2013 | Pottjegort |
| 2017/0316467 A1 | 11/2017 | Seiler et al. |

OTHER PUBLICATIONS

Notice of Allowance dated Mar. 17, 2021 in U.S. Appl. No. 13/836,700, pp. 1-25.
Notice of Allowance dated Jul. 26, 2023 in U.S. Appl. No. 17/379,699, pp. 1-30.
Office Action dated Jan. 12, 2016 in U.S. Appl. No. 13/836,700, pp. 1-30.
Office Action dated Feb. 9, 2018 in U.S. Appl. No. 13/614,878, pp. 1-29.
Office Action dated Feb. 28, 2023 in U.S. Appl. No. 17/379,699, pp. 1-17.
Office Action dated Mar. 25, 2015 in U.S. Appl. No. 13/836,700, pp. 1-23.
Office Action dated Apr. 22, 2015 in U.S. Appl. No. 13/614,878, pp. 1-16.
Office Action dated May 11, 2022 in U.S. Appl. No. 17/379,699, pp. 1-19.
Office Action dated May 16, 2019 in U.S. Appl. No. 13/836,700, pp. 1-23.
Office Action dated Jul. 13, 2017 in U.S. Appl. No. 13/836,700, pp. 1-27.
Office Action dated Jul. 20, 2018 in U.S. Appl. No. 13/836,700, pp. 1-19.
Office Action dated Aug. 2, 2013 in U.S. Appl. No. 13/614,878, pp. 1-16.
Office Action dated Aug. 5, 2022 in U.S. Appl. No. 13/614,878, pp. 1-29.
Office Action dated Aug. 7, 2020 in U.S. Appl. No. 13/614,878, pp. 1-13.
Office Action dated Aug. 21, 2020 in U.S. Appl. No. 13/836,700, pp. 1-21.
Office Action dated Sep. 28, 2016 in U.S. Appl. No. 13/836,700, pp. 1-16.
Office Action dated Oct. 5, 2018 in U.S. Appl. No. 13/614,878, pp. 1-21.
Office Action dated Oct. 9, 2019 in U.S. Appl. No. 13/614,878, pp. 1-21.
Office Action dated Nov. 9, 2023 in U.S. Appl. No. 13/614,878, pp. 1-16.
Office Action dated Nov. 16, 2016 in U.S. Appl. No. 13/614,878, pp. 1-23.
Office Action dated Dec. 20, 2012 in U.S. Appl. No. 13/614,878, pp. 1-19.
Office Action dated Dec. 22, 2021 in U.S. Appl. No. 13/614,878, pp. 1-12.
Sharp, R., "Element 'In View' Event Plugin", Jan. 26, 2009, pp. 1-3, available at: https://web.archive.org/web/*/http://remysharp.com/2009/01/26/element-in-view-event-plugin/.
Sprankel, S., "Online Tracking Targeted Advertising and User Privacy—The Technical Part", Technical Report, Technical University of Darmstadt, Sep. 30, 2011, pp. 1-11, available at: https://www.coderblog.de/wp-content/uploads/online-tracking-targeted-advertising-user-privacy-paper.pdf.
U.S. Appl. No. 13/614,878, filed Sep. 13, 2012, pp. 1-46.
U.S. Appl. No. 61/534,249, filed Sep. 13, 2011, pp. 1-7.
U.S. Appl. No. 61/585,317, filed Jan. 11, 2012, pp. 1-11.
U.S. Appl. No. 61/594,311, filed Feb. 2, 2012, pp. 1-15.
Van Bebber, P., "Informed Consent in Behavioral Advertising", Thesis, Radboud University, Oct. 11, 2011, pp. 1-83.
W3c, "Cascading Style Sheets, Level 2 Revision 1 (CSS 2.1) Specification", Technical Report, W3C Candidate Recommendation, Jul. 19, 2007, pp. 1-405.

SYSTEMS, METHODS, AND MEDIA FOR DETECTING CONTENT VIEWABILITY

CROSS-REFERENCE TO RELATED APPLICATIONS

This application is a continuation of U.S. patent application Ser. No. 17/379,699, filed Jul. 19, 2021, which is a continuation of U.S. patent application Ser. No. 13/836,700, filed Mar. 15, 2013, which claims the benefit of U.S. Provisional Application No. 61/735,530, filed Dec. 10, 2012, each of which is hereby incorporated herein by reference in its entirety.

This application is also related to U.S. patent application Ser. No. 13/614,878, filed Sep. 13, 2012, which claims the benefit of U.S. Provisional Patent Application No. 61/534,249, filed Sep. 13, 2011, U.S. Provisional Patent Application No. 61/585,317, filed Jan. 11, 2012, and U.S. Provisional Patent Application No. 61/594,311, filed Feb. 2, 2012, which are hereby incorporated by reference herein in their entireties.

TECHNICAL FIELD

In accordance with some embodiments, systems, methods, and media for detecting content viewability are provided.

BACKGROUND

Media content, including advertising content, is created with the goal of having the content viewed, listened to, and/or otherwise received by a target audience. The target audience can be, for example, one or more users with a set of particular interests or one or more users falling in a particular demographic or psychographic group. However, distributing such media content to the desired audience is a difficult process, as is determining whether media content that has been distributed has reached the desired audience. It is often difficult for brand managers, ad networks, publishers, advertisers, and/or advertising agencies (collectively referred to herein as "advertisers") to control and manage the service and/or provision of their advertisements, as well as the tracking of the results.

Several approaches have been proposed that attempt to determine whether an advertisement has been viewed. For example, a website, advertiser, or other online content owner can measure the number of times that browsers access content hosted on one or more servers (e.g., a number of hits by browsers). In another example, advertisement tags including HTML or JavaScript code have been provided for placement within a website or other online content in order to determine display of the content, including display of advertisements associated with the content. These advertisement tags can be used to control or track advertisement delivery. These approaches, however, are frequently limited to determining whether an advertisement has been served to a browser.

A frequent limiting factor involves content that is rendered onto a page within cross-domain nested iframes or other constructs that limit the enclosed content's ability to determine its relative position within the parent page due to browser "Same Origin Policy" or the like, making it difficult to determine whether the advertisement has actually appeared in a viewable area on a browser application. To overcome this obstacle, technology has been created which does not access the Document Object Model (DOM) of the parent to deduce whether an object is viewable within a user's browser. In one example, certain browsers expose coordinate information that can be accessed via scripting to determine viewability. However, this approach is only available in a small subset of browsers. In yet another example, FLASH-based monitoring code has been provided for placement within a web site in order to monitor advertisement viewability, using the frame rate or other optimizations within FLASH that change depending on whether the FLASH object is on- or off-screen as a proxy for determining viewability. However, this approach has significant limitations, such as requiring that the browser or device running the browser support FLASH, a component that is not supported in many leading commercial browsers and/or operating systems. Further, this approach involves placing FLASH content within cross-domain iframes, which may violate advertiser or publisher guidelines.

Therefore, there is a need in the art for approaches for controlling and managing the distribution and tracking of advertisements for publication on webpages and/or web sites. Accordingly, it is desirable to provide methods, systems, and media that overcome these and other deficiencies of the prior art.

SUMMARY

In accordance with some embodiments of the disclosed subject matter, systems, methods, and media for detecting content viewability are provided.

In some embodiments, systems, methods, and media are provided that allow advertisers to detect content viewability using files having certain state-changing characteristics, such as animated image files. In accordance with some embodiments, a method for detecting content viewability is provided, the method comprising: receiving a request to serve an advertisement on a webpage; causing an advertisement tag to be displayed along with the advertisement in response to receiving the request, wherein the advertisement tag comprises, links to, or otherwise calls to be rendered an animated image file, such as an animated pixel file, that changes between a plurality of characteristic states, such as colors; and determining whether the advertisement has been or is in view by detecting one of the plurality of states (e.g., colors) emitted by or embodied by the animated image file.

In some embodiments, a method for detecting content viewability is provided, the method comprising: receiving a request to serve a plurality of advertisements on a webpage; assigning an advertisement tag to each of the plurality of advertisements, wherein the advertisement tag comprises an animated image file that changes between a sequence of colors or other characteristics; causing the advertisement tag to be displayed proximal to each of the plurality of advertisements, wherein each color or other characteristic in a sequence of colors or characteristics is displayed at a given time; and determining whether at least one of the plurality of advertisements has been or is in view based on the color or other characteristic emitted or embodied by the animated image file.

In some embodiments, a method for detecting content viewability is provided, the method comprising: receiving a request to provide content; retrieving the content from a source based on the received request; dividing the retrieved content into a plurality of portions of content; inserting an animated file that includes a plurality of colors or other characteristics adjacent to each of the plurality of portions, wherein the animated file rotates between the plurality of colors or states at predetermined time intervals; determining a color or other state of the plurality of colors or states from the animation that is currently being displayed in the browser window; and determining which of the plurality of portions of content is being displayed in the browser window based on the determined color from the animated file.

In some embodiments, a method for detecting content viewability is provided, the method comprising: causing an animated image file to be included in content intended for publication, the image file changing between a plurality of characteristic states, such as colors; and determining whether the content has been or is in view by detecting one of the plurality of states (e.g., colors) emitted by or embodied by the animated image file.

In some embodiments, a method for detecting content viewability is provided, the method comprising: receiving a request for tracking code associated with an advertisement for publication, wherein the tracking code is configured to place an animated image file along with the advertisement and to collect information relating to the animated image file; and, in response to serving the advertisement, receiving the collected information relating to the animated image file, wherein the collected information includes detecting one of a plurality of states (e.g., colors) emitted by or embodied by the animated image file.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
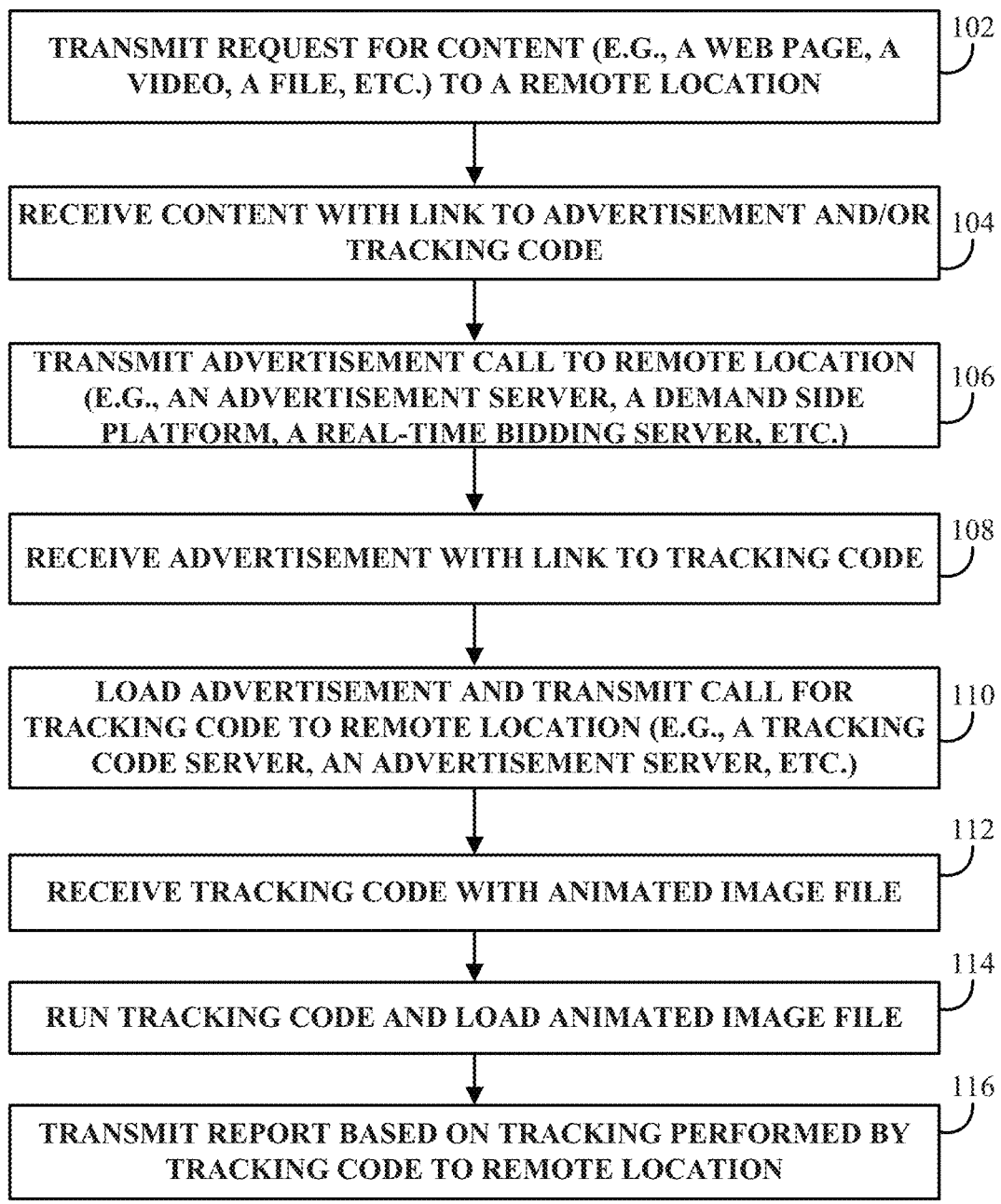
FIG. 1 is a diagram of an illustrative process for detecting content viewability using a content viewability application in accordance with some embodiments of the disclosed subject matter.

Generally speaking, mechanisms for detecting content viewability are provided. For example, in some embodiments, these mechanisms can be used to provide an animated image file that is associated with content or a portion of content, such as an advertisement on a webpage. The animated image file can include a sequence of colors, where each color is displayed at a given time interval. By monitoring one or more animated image files for a given webpage, the mechanisms can be used to determine whether the content (or portion of content) was in view or is in view, and the amount of time that the content was in view. It should be noted that, when the animated image file is displayed in a browser window, the animated image file is animated (e.g., the sequence of colors is played back). On the other hand, when the animated image file is not displayed in the browser window (e.g., because the browser scrolled away, because the animated image file is not in view, etc.), the animated image file ceases to animate in some currently available browsers.

It is noted that while color is an example of a characteristic of an animated image file that can be changed and detected at different sampling times, other suitable characteristics can be detected, such as patterns or symbols of collections of pixels (e.g., as used in QR codes or bar codes), or the like, including files or objects that cycle between "on" and "off" binary states or "zero" and "one" binary states. Also, while animated image files that change colors are one example of content in which the state of the content can be straightforwardly detected, other types of files or content that change state, which can include dynamic text and/or changing symbolic content, can be used in alternative embodiments. References to color changes throughout this disclosure should be understood to encompass, as context permits, other such state changes, and references to animated image files should be understood to encompass, as context permits, other state-changing files or objects.

In some embodiments, the animated image file is a single pixel (1×1 pixel) animated GIF (sometimes referred to as Graphics Interchange Format) that is associated with content, such as an advertisement. Alternatively, the animated image file can be placed at particular browser coordinates to determine whether content displayed at or around such coordinates has appeared in the browser window. The animated image file can include multiple colors that rotate through a particular sequence. Any suitable number of colors can be included that can change in any suitable sequence. For example, the animated image file can rotate through four colors every second—e.g., a rotation between a blue color, a red color, a green color, and a yellow color each second. As another example, the animated image filed can progress through 256 colors over a specified time period—e.g. a progression through 256 colors in which the color changes twice per second (or any other suitable number of changes). By monitoring the animated image file and the color or sequence of colors of the animated image file, the mechanisms can determine whether the content has been viewed (e.g., by detecting the animated image file itself), determine when the content has been viewed (e.g., by detecting the color of the animated image file), determine how long the content has been viewed (e.g., by monitoring the particular sequence of colors of the animated image file), determine whether certain pieces of content in a browser window are viewed more than other pieces of content, determine which pieces of content in a browser window have not been viewed (e.g., by determining that particular animated image files did not animate), etc.

In a more particular example, in response to receiving a request from a web browsing application to retrieve an advertisement, a content viewability application can intercept or redirect an advertisement call from a browser such that an advertisement tag in the form of an animated image file (e.g., a 1×1 pixel GIF) is assigned to the requested advertisement. As described above, the animated image file can be rendered along with the advertisement, where the animated image file is animated when within the browser window and where the animation can include changing between a plurality of colors. The content viewability application can determine whether the advertisement has been viewed or is in view by detecting one of the plurality of colors emitted by the animated image file. Alternatively, the content viewability application can determine the length of time that the advertisement has been viewed by monitoring the sequence of colors emitted by the animated image file.

It should be noted that, although some embodiments described herein refer to one advertisement and one advertisement tag in the form of an animated image file associated with the advertisement, this is merely illustrative. Multiple advertisement tags can be generated, where each advertisement tag is associated with a particular piece of content (e.g., a portion of content on a webpage, an upper portion of a long advertisement, etc.). By monitoring the multiple advertisement tags, the content viewability application can determine whether certain pieces of content in a browser window are viewed longer than other pieces of content, determine which pieces of content in a browser window have not been viewed (e.g., by determining which animated image files did not animate), etc.

In another more particular example, in response to receiving a request from a browser application to access a particular website or webpage, the content viewability application can receive the content for presenting to the browser. The content viewability application can divide the content into multiple portions. It should be noted that any suitable approach for dividing the content can be used. For example, the content viewability application can separate the content into paragraphs. In another example, the content viewability application can separate the content into portions based on the total amount of content (e.g., number of words, number of paragraphs, length in the particular browser window, etc.).

Upon dividing the content into multiple portions, the content viewability application can place a tag in the form of an animated image file adjacent to (or within) each portion of content. For example, in some embodiments, the animated image file is a 1×1 pixel animation that is placed at particular browser coordinates. The content viewability application can provide an animated image file that animates in response to being displayed within the browser window (e.g., is in-view). For example, the animated image file can cause the 1×1 pixel animation to rotate between multiple colors in a particular sequence—e.g., a rotation between a blue color, a red color, a green color, and a yellow color each second. In such an example, animation of the animated image file can be inhibited in response to being out of view, based on the position in the browser window (or outside the browser window).

In response to placing the animated image file(s) adjacent to content for presentation to the browser, the content viewability application can monitor the animated image files. For example, the content viewability application can monitor the placed animations and determine the color of the 1×1 pixel animations. In another example, the content viewability application can determine which animated image files are displayed in the browser viewport and retrieve the color provided by those animations in the browser viewport at the specified browser coordinates.

In response to detecting the color provided by one or more animations, the content viewability application can determine the content associated with the detected color and the detected animation. This can be used, for example, to determine which content is viewed by the browser in the browser application. In another example, by monitoring the color of multiple animated image files, the content viewability application can determine which content (e.g., web content, advertisements, etc.) has been viewed during a browsing session. In yet another example, by monitoring the color of multiple animated image files, the content viewability application can determine which content has been displayed in a browser viewport.

Referring now to FIG. 1, an example 100 of a process for detecting content viewability is shown in accordance with some embodiments of the disclosed subject matter. At 102, an application (e.g., a browser application, an email application, a content delivery application, etc.) running on a computing device (e.g., a personal computer, a laptop computer, a tablet computer, a smartphone, etc.) can transmit a request for content to a remote location (e.g., a publisher server, a cloud server, etc.). In some embodiments, the content can include a webpage, a video, an email, a file such as a text file, or the like, or any suitable combination thereof. Such a request can be initiated by, for example, entering a Uniform Resource Locator (URL) into a browser (or any other type of Uniform Resource Identifier), selecting a link from another document, selecting an item of content from a menu, etc. It should be noted that, although a browser application is used as an example of an application for executing process 100 hereinbelow, it is understood that any suitable application can execute process 100.

At 104, the browser application can receive the requested content with a link to an advertisement included with the received content. For example, in some embodiments, if the browser application requests a webpage corresponding to a particular URL, the request can be sent to a publisher server that stores instructions for rendering the webpage. In such an example, the webpage can include instructions (which may be referred to herein as a link to an advertisement) that cause the browser application to request an advertisement to be placed within the webpage at one or more specified locations. Such a location can be an iframe of a particular size at a particular location within the webpage, in some embodiments. Additionally or alternatively, a location for an advertisement can be specified using any suitable technique(s), such as by indicating coordinates and a size of the advertisement to be rendered, specifying a link to an advertisement to be rendered at particular coordinates, providing a frame at a particular location that restricts access to a parent domain (e.g., the content received at 104, such as a domain of a webpage).

In some embodiments, the requested content can be transmitted to a computing device running the browser application from a publisher server in accordance with techniques described below in connection with FIG. 2.

Additionally or alternatively, tracking code can be included in the content in some embodiments. For example, tracking code can be included at various locations within the content to determine if those locations were viewed by a user of an application used to present content. For instance, links to tracking code can be included at various locations in an email sent to a user of an email application, such that a sender of the email can determine whether certain portions of the email have been viewed by a user of the email application. This can allow a sender of the email to determine if their email is being read by a user or whether the email has been ignored.

In some embodiments, the user of the browser application or any other suitable application (e.g., an email application) can be provided with an opportunity to control whether these applications can include tracking code or any other suitable code for detecting content viewability that is used to collect user information (e.g., information about content accessed by the user, information about a user's interactions with content, information about advertisements viewed by the user, etc.).

At 106, the browser application can transmit an advertisement call to a remote location (e.g., an advertising server, a demand side platform, a real-time bidding exchange server, etc.) in response to a link to an advertisement contained in the content. In some embodiments, such an advertising call can include parameters relating to the content, such as the size of the advertisement, information regarding whether the advertisement is considered by the publisher of the content to be above-the-fold, information regarding a browsing history of the browser, demographic or psychographic characteristics of a user, etc.

At 108, the browser application can receive an advertisement including a link to tracking code (e.g., instructions to request and load tracking code). Such an advertisement can include any suitable content, such as images, text, video, sound, animation, etc., as well as links to other content.

In some embodiments, the received advertisement can be transmitted to the computing device running the browser application from an advertisement server in accordance with techniques described below in connection with FIG. 3.

At 110, the browser application can load the advertisement and transmit a call for tracking code to a remote location in response to executing the link to the tracking code. The advertisement can be loaded using any suitable techniques. For example, in some embodiments, the advertisement can be loaded from a domain of the advertisement server that transmitted the advertisement. As another example, the advertisement can be loaded from multiple domains indicated by the advertisement, such as, one domain for text and/or images and another domain for sound and/or video.

In some embodiments, the call for tracking code can be transmitted in response to a link to tracking code embedded within the advertisement received at 108. For example, in some embodiments, the link to tracking code can include a URL, JavaScript, HTML, any other suitable code that causes the browser to request the tracking code, or any suitable combination thereof.

In some embodiments, the call for tracking code can be transmitted to any suitable location. For example, in some embodiments, the call for tracking code can be transmitted to a location (e.g., an Internet Protocol (IP) address) of a tracking code server. As another example, the tracking code call can be transmitted to a URL that can redirect the call to an appropriate server.

In some embodiments, the call for tracking code can include an identification of a type of browser transmitting the call (e.g., whether the browser is a full browser or a mobile browser, a version of the browser, the underlying technology used to power the browser such as a layout engine used, a brand of browser such as GOOGLE CHROME, MICROSOFT EXPLORER, of any other suitable browser information).

At 112, the browser application can receive tracking code and an animated image file. The tracking code can be implemented using any suitable techniques. For example, the tracking code can include JavaScript that tracks one or more states and/or characteristics of an animated image file at one or more points in time. As another example, the tracking code can include a Java applet that tracks one or more states and/or characteristics of an animated image file at one or more points in time. As yet another example, the tracking code can include HTML code that tracks one or more states and/or characteristics of an animated image file at one or more points in time.

In some embodiments, the animated image file can include a GIF image file configured to rotate through various states based on time. For example, as described above, the animated image file can include a 1×1 pixel GIF that is configured to display multiple colors over time. For instance, as described above, a 1×1 pixel GIF can be configured to rotate through four colors every second.

In many current browser applications, when a GIF image file configured to rotate or progress through different frames or states is located outside of a current viewing area (e.g., outside of a viewport) presented by the browser application, the browser application does not animate the GIF. For example, in response to the user of the browser application navigating such that the GIF image is within the current viewing area, the browser application can animate or progress through various states of the GIF image file. In this example, if the user of the browser application navigates such that the GIF image is not within the current viewing area, the browser application can inhibit the GIF image file from animating or progressing through various states. Upon navigating such that the GIF image file returns to the current viewing area, the browser application can continue to animate the GIF image file or progress the GIF image file through various states (e.g., the browser application can continue from the previous point where the GIF image file was animated, the browser application can jump to a different point in the GIF image file based on the amount of time that has elapsed, etc.).

In some embodiments, tracking code received by the browser application at 112 can be based on browser information transmitted at 110. For example, different browser applications may behave differently and a type of tracking code received at 112 can be based on the anticipated behavior of the browser application based on the information received at 110. Additionally, if it is determined that a browser that requested the tracking code at 110 is incompatible with the mechanisms described here, process 100 can end in some embodiments without the browser application receiving tracking code at 112.

In some embodiments, the received tracking code and animated image file can be transmitted to the computing device running the browser application from a tracking code server in accordance with techniques described below in connection with FIG. 4

At 114, the browser application can cause the tracking code to run and can load the animated image file. The tracking code can be run (e.g., executed) using any suitable techniques. For example, in some embodiments, the browser application itself can run the tracking code (e.g., the tracking code includes code, such as code included in an applet, that the browser application is configured to execute). Additionally or alternatively, the tracking code can be executed in connection with the browser application by a separate application, such as a browser plug-in or a browser add-on (e.g., the tracking code includes code, such as code included in an applet, that the browser application is not configured to execute).

Similarly, the animated image file can be loaded using any suitable techniques. For example, in some embodiments, the browser application itself can load the animated image file (e.g., the animated image file is in a format that the browser application is configured to load). Additionally or alternatively, the animated image file can be loaded in connection with the browser application by a separate application, such as a browser plug-in or a browser add-on (e.g., the animated image file is in a format that the browser is not configured to load).

In some embodiments, the tracking code can periodically determine the state of the animated image file. For example, the tracking code can periodically determine a color of the animated image file (e.g., whether the state of the animated file is currently red, blue, green, yellow, etc.). In such an example, the tracking code can store a record of the colors determined at periodic times in any suitable location, such as the browser application's cache.

At 116, the browser application can cause a report to be transmitted to a remote location. Such a report can include any suitable information recorded by the tracking code, such as, whether the animated image file was ever in view, how long the animated image file was in view, a proportion of the time that the animated image file was in view, or any other suitable information regarding the animated image file. In some embodiments, such a report can also indicate an identification of an advertisement associated with the animated image file and/or a location of the animated image in relation to the associated advertisement (e.g., where the animated image file was loaded with respect to the advertisement, such as top-left, bottom-right, etc.). A location of the animated file in relation to the advertisement can be based on coordinates of the advertisement, coordinates of a frame (e.g., an iframe) that the advertisement is loaded within, coordinates of a document, such as a webpage, etc.

In some embodiments, the report transmitted at 116 can be received by a data server as described below in connection with FIG. 5. Additionally or alternatively, the report transmitted at 116 can be transmitted to any suitable location such as a tracking code server that transmitted the tracking code to the browser application.

As described herein, in some embodiments, a user of the browser application or any other suitable application can be provided with an opportunity to control the information recorded and transmitted by the tracking code or any other suitable code for detecting content viewability that is used to collect user information.

Figure 2:
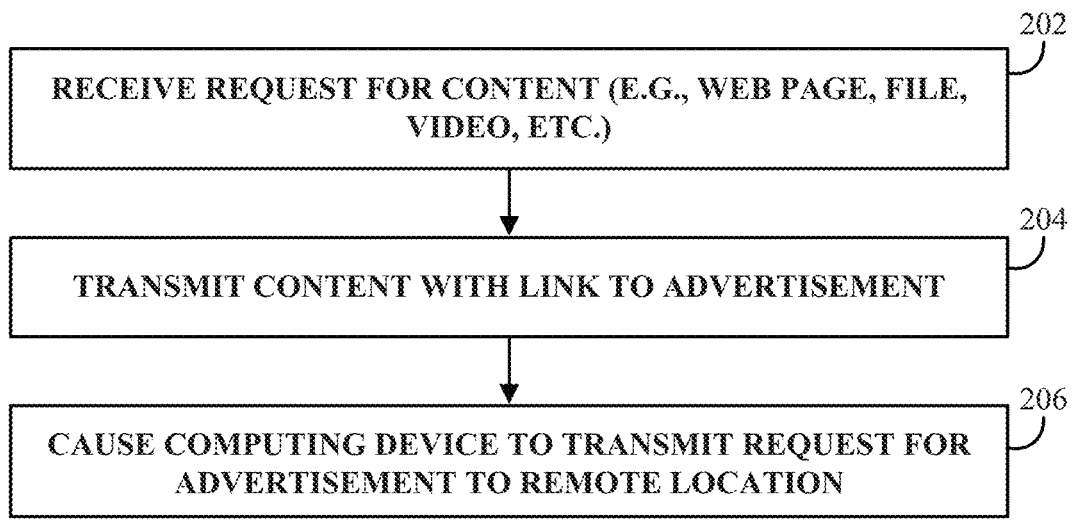
FIG. 2 is a diagram of an illustrative process for transmitting content with an advertisement link for use in detecting content viewability in accordance with some embodiments of the disclosed subject matter.

Turning to FIG. 2, an example 200 of a process for transmitting content with a link to advertising is shown in accordance with some embodiments of the disclosed subject matter. At 202, a content serving application can receive a request for content from an application running on a computing device. For example, the request for content can be received from a browser application running on a computing device, such as a personal computer, a laptop computer, a tablet computer, a smartphone, a game console, etc. As another example, the request for content can be received from a special purpose application running on a computing device, such as an email application, a media playback application, or any other suitable application for presenting content to a user.

In some embodiments, the content serving application can execute on a publisher server that stores content associated with a particular location, such as a URL, an IP address, etc.

A request received at 202 can be a request for any suitable content. For example, the request can be a request for a webpage, a file, a video, text, an image, any other suitable type of content, or any suitable combination thereof. In such an example, the content can include references and/or links to other content, such as advertisements.

At 204, the content serving application can transmit the requested content (e.g., a webpage) with a link to an advertisement in response to the request received at 202. It should be noted that the link to an advertisement can include any suitable advertisement call. For example, in some embodiments, the link to an advertisement can include a redirect that causes a browser application to request an advertisement from any suitable advertisement source, such as, an advertisement server, a demand side platform, a real-time bidding exchange, an advertising network, etc. As another example, the link to an advertisement can contain a URL, an IP address, etc.

Additionally or alternatively, the content transmitted by the content serving application can include advertisements, tracking code, and/or one or more animated image files in addition to or in place of one or more links to advertisements. For example, a webpage can be transmitted that includes both advertisements and links to advertisements. As another example, tracking code and an animated image file can be included in the content to facilitate tracking of whether a portion of the content is viewed.

At 206, the device that requested the content (e.g., a personal computer, a laptop computer, a tablet computer, a smartphone, a smart television, etc.) can be caused to transmit a request for an advertisement to a remote location (e.g., transmit an advertisement call to a remote location). As described above, such a request can be made to any suitable location, such as an advertisement server, a demand side platform, etc. In some embodiments, the advertisement call can include redirect or intercept instructions that can cause the advertisement call to be sent to a first location where tracking code, a link to tracking code, an animated image file, and/or a link to an animated image file can be inserted into the advertisement call. Redirection features are further described, for example, in commonly owned, commonly assigned U.S. Patent Application Publication No. 2011/0106634, which is hereby incorporated by reference herein in its entirety.

Figure 3:
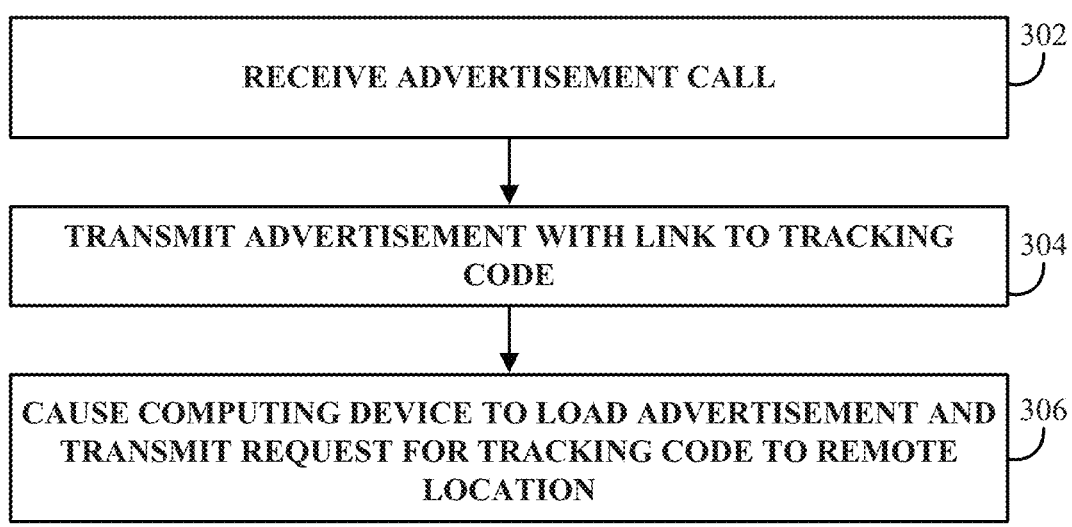
FIG. 3 is a diagram of an illustrative process for transmitting an advertisement to a computing device with a link to tracking code for use in detecting content viewability in accordance with some embodiments of the disclosed subject matter.

FIG. 3 shows an example 300 of a process for transmitting an advertisement with a link to tracking code in accordance with some embodiments of the disclosed subject matter. At 302, an advertisement serving application can receive an advertisement call from an application running on a computing device. For example, the request for content can be received from a browser application running on a computing device, such as a personal computer, a laptop computer, a tablet computer, a smartphone, a game console, etc. As another example, the request for content can be received from a special purpose application running on a computing device, such as an email application, a media playback application, or any suitable application for presenting content to a user.

In some embodiments, the advertisement serving application can execute on an advertisement server that stores advertisements associated with a particular advertiser and/or group of advertisers. Such advertisements can be stored and/or categorized using any suitable techniques, such as, based on a target demographic, by advertiser, etc. As described above in connection with FIG. 2, an advertisement call can be intercepted or redirected to a different location prior to being received at an advertisement server at 302. For example, an advertisement call can be intercepted at a remote location where a link to tracking code, tracking code, a link to an animated image file, and/or an animated image file can be inserted into the advertisement call.

As another example, an advertisement call can be directed to a real-time bidding application that carries out a real-time bidding process for determining an advertisement to transmit to a computing device that transmitted the advertisement call. Additionally or alternatively, an advertisement call can be directed to a demand side platform, an advertising network, etc. to determine an advertisement to be placed in response to an advertisement call.

In some embodiments, any suitable techniques can be used to determine a particular advertisement to transmit to the computing device that transmitted the advertisement call received at 302. For example, in some embodiments, the advertisement call can specify a particular advertisement to transmit in response to the advertisement call. As another example, a real-time bidding application can be used to determine an advertisement to transmit in response to the advertisement call. As yet another example, a demand side platform can be used to determine an advertisement to transmit in response to the advertisement call. As still another example, an advertising network can be used to determine an advertisement to transmit in response to the advertisement call. As a further example, any suitable combination of techniques can be used to determine an advertisement to transmit in response to the advertisement call.

At 304, the advertisement serving application can transmit an advertisement with a link to tracking code in response to the request received at 302. As described above, an advertisement transmitted at 304 can be selected using any suitable techniques.

Additionally or alternatively, the advertisement serving application can transmit tracking code and/or an animated image file(s) with the advertisement at 304 in addition to or in place of the link to tracking code. For example, as described above, tracking code and/or an animated image file can be inserted into the advertising call with an instruction to an advertisement serving application to pass the tracking code and/or the animated image file with the advertisement.

In some embodiments, any suitable techniques can be used to provide a link to tracking code. For example, in some embodiments, the link to tracking code can include a URL, IP address, etc., of a location from which to download tracking code. In such an example, the link to tracking code can include code that instructs a browser, a browser plug-in, a browser add-on, or a specialized application to request tracking code from a particular location, and instructions to run the tracking code when the tracking code has been downloaded from the particular location.

At 306, the device that requested the content (e.g., a personal computer, a laptop computer, a tablet computer, a smartphone, a smart television, etc.) can be caused to transmit a request for tracking code to a remote location (e.g., transmit an call for tracking code to a remote location). As described above, such a request can be made to any suitable location, such as a tracking code server.

Figure 4:
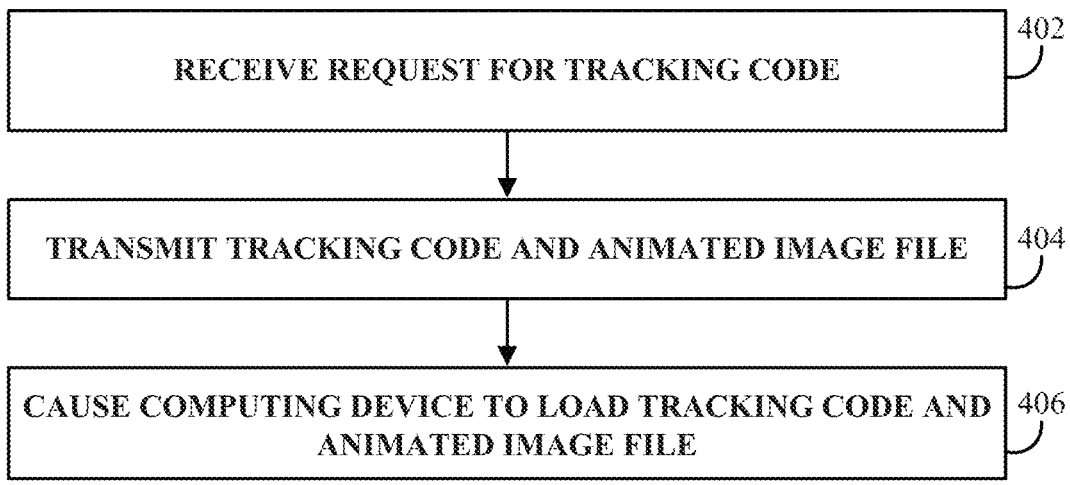
FIG. 4 is a diagram of an illustrative process for transmitting tracking code and an animated image file for use in detecting content viewability in accordance with some embodiments of the disclosed subject matter.

FIG. 4 shows an example 400 of a process for transmitting tracking code and an animated image file in accordance with some embodiments. At 402, a tracking code serving application can receive a request for tracking code from an application running on a computing device. For example, the request for content can be received from a browser application running on a computing device, such as a personal computer, a laptop computer, a tablet computer, a smartphone, a game console, etc. As another example, the request for content can be received from a special purpose application running on a computing device, such as an email application, a media playback application, or any suitable application for presenting content to a user.

In some embodiments, the tracking code serving application can execute on a tracking code server that stores tracking code and/or animated image files. For example, the tracking code serving application can execute on a server where it accepts requests for tracking code and transmits tracking code in response to receiving a request for tracking code.

At 404, the tracking code serving application can transmit tracking code and/or an animated image file in response to receiving a request for tracking code at 402. It should be noted that the tracking code serving application can be associated with multiple different versions of tracking code that can each be configured to track an animated image file using different tracking techniques and/or different combinations of tracking techniques. For example, different versions of tracking code can be configured to track different animated image files with various different properties, such as, a different number of colors displayed, an image file that displays different symbols rather than different colors, a monochromatic version, a binary version, etc. As another example, different versions of tracking code can be configured to track an animated image file using different techniques, such as, tracking whether an animated image file was in view, tracking how long an animated image file was in view, tracking changes in an animated image file more or less frequently (e.g., based on a type of content), etc. As yet another example, different versions of tracking code can be configured to operate based on different browser specifications.

Additionally or alternatively, the tracking code serving application can be associated with a single version of tracking code and a different tracking code serving application can be associated with a different version of tracking code.

At 406, the device that requested the content (e.g., a personal computer, a laptop computer, a tablet computer, a smartphone, a smart television, etc.) can be caused to load and run the tracking code and to load an animated image file associated with the tracking code. As described above, the animated image file can be loaded in association with an advertisement requested by a computing device. As described above, tracking a state of an animated image file that is loaded in association with an advertisement using tracking code can allow for the viewability of the advertisement to be determined.

Figure 5:
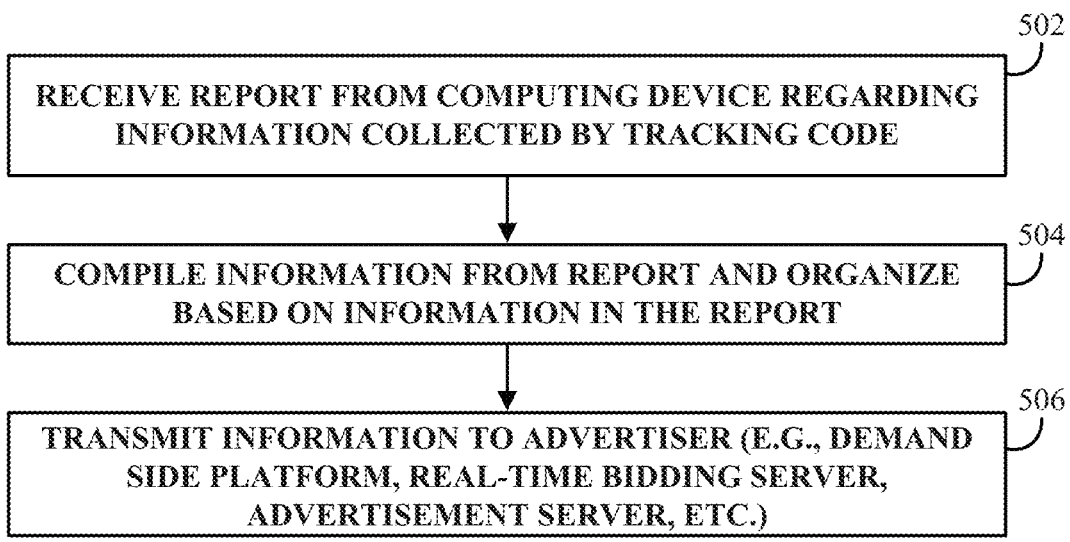
FIG. 5 is a diagram of an illustrative process for receiving information regarding content viewability for use in detecting content viewability in accordance with some embodiments of the disclosed subject matter.

Turning to FIG. 5, an example 500 of a process for receiving reported information is shown in accordance with some embodiments. At 502, an information receiving application can receive a report from a computing device running tracking code (or that ran tracking code). The report can contain information collected by the tracking code regarding the state of an animated image file or the like. For example, in some embodiments, the report can contain information regarding whether the animated image file animated (e.g., whether the animated image file was ever in view), how long the animated image file animated, or any other suitable information regarding the animated image file. As another example, the report can contain information regarding a type of browser application which rendered the animated image file, which can be used in interpreting the information regarding the rendering of the animated image file, as certain browser applications may treat the animated image file differently (e.g., a first browser application may render the animated image file only when the image file is within the viewport, a second browser application may render the animated image file when it first appears in the viewport and continue rendering the animated image file until an unload of a page containing the animated image file, etc.).

In some embodiments, the report can include information regarding an advertisement that the tracking code is associated with. For example, an identification of an advertisement and/or advertiser can be included in the report. As another example, an identification of a URL (e.g., a parent domain) where the advertisement appeared can be included in the report. As another example, a location on a webpage where the advertisement appeared and/or or a location where the advertisement was supposed to appear (e.g., above the fold, below the fold, coordinates within a web site, etc.).

In some embodiments, the information receiving application can execute on a data server that stores information received in reports from tracking code, among other things. For example, the information receiving application can execute on a server where it accepts reports sent from computing devices running tracking code (or that ran tracking code).

At 504, the information receiving application can compile information received in the report at 502 with information received in other reports. Such information can be organized in any suitable manner. For example, in some embodiments, the information can be organized based on an identification of an advertisement associated with the tracking code. As another example, the information can be organized based on an identification of an advertising campaign that includes an advertisement associated with the tracking code. As yet another example, the information can be organized based on a location where the advertisement appeared (e.g., an identification of a URL or IP address where the advertisement).

At 506, the information receiving application can transmit the information that was collected and/or compiled to advertisers in response to a request for information regarding the visibility of an advertisement. In some embodiments, the information receiving application can be executed by an advertisement server and/or can be in communication with an advertisement server to distribute information regarding advertisement viewability to advertisers. Advertisement viewability metrics and techniques for communicating advertisement viewability are further described, for example, in commonly owned, commonly assigned U.S. patent application Ser. No. 13/614,878, which is hereby incorporated herein by reference in its entirety.

Figure 6A:
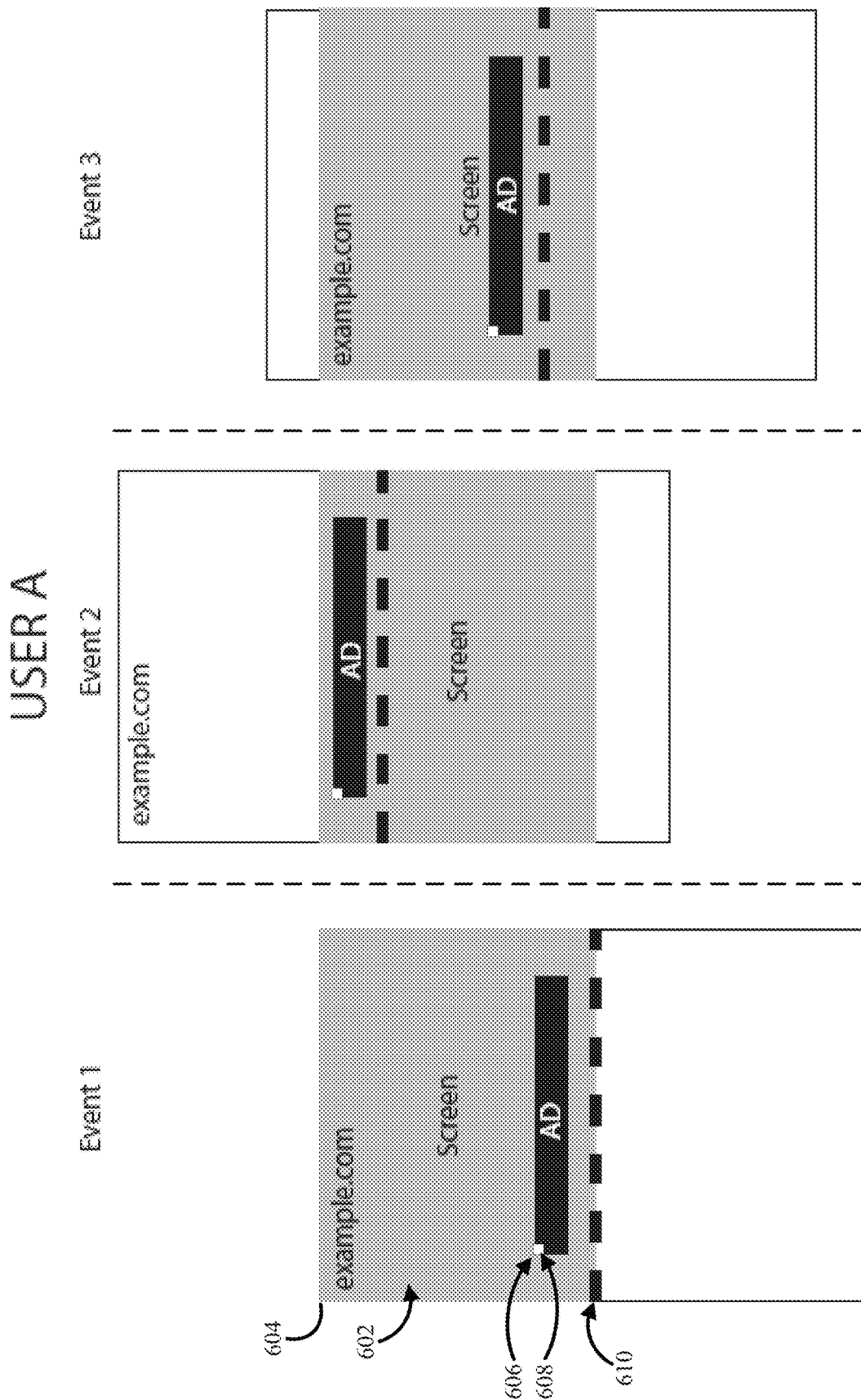
FIGS. 6A-6C show illustrative examples of a user using a browser window having a viewport to view a webpage (having the URL "example.com"), where three scroll actions on the webpage are shown, in accordance with some embodiments of the disclosed subject matter.

FIG. 6A shows an example of a user, User A, using a browser window having a viewport 602 to view a webpage 604 (having URL "example.com"), where three scroll actions on webpage 604 are shown in the example. An advertisement 606 is loaded in webpage 604 with an included animated image file 608. It should be noted that animated image file 608 is not shown in the FIG. 6A at actual size, but instead is representative of a possible location where an animated image file can be loaded in association with an advertisement. As described above, animated image file 608 can include a 1×1 pixel GIF that is configured to rotate through multiple colors (e.g., four colors every one second).

In this example, advertisement 606 is "above the fold," where the fold is represented by line 610. Event 1 shows that viewport 602 is aligned with the top of webpage 604, event 2 shows that the user has scrolled to a lower portion of webpage 604, and event 3 shows that the user has returned to a higher portion of webpage 604 (but not to the top of webpage 604). In each of these events, it should be noted that advertisement 606 and animated image file 608 appear within viewport 602.

In such an example, a browser application rendering webpage 604 can animate animated image file 608 the entire time that the webpage is loaded in the browser application. For example, the animated image file can rotate through colors as long as the animated image file remains within viewport 602. As another example, the animated image can rotate through colors for a particular period of time (e.g., thirty seconds, two minutes, etc.) while animated image file 608 is within viewport 602. Tracking code that is loaded in association with the animated image file can collect information regarding whether the animated image file is being animated by the browser application and/or what color the animated image file is at various times. The tracking code can then report on the viewability of advertisement 606 with which animated image file 608 is associated based on the collected information.

Figure 6B:
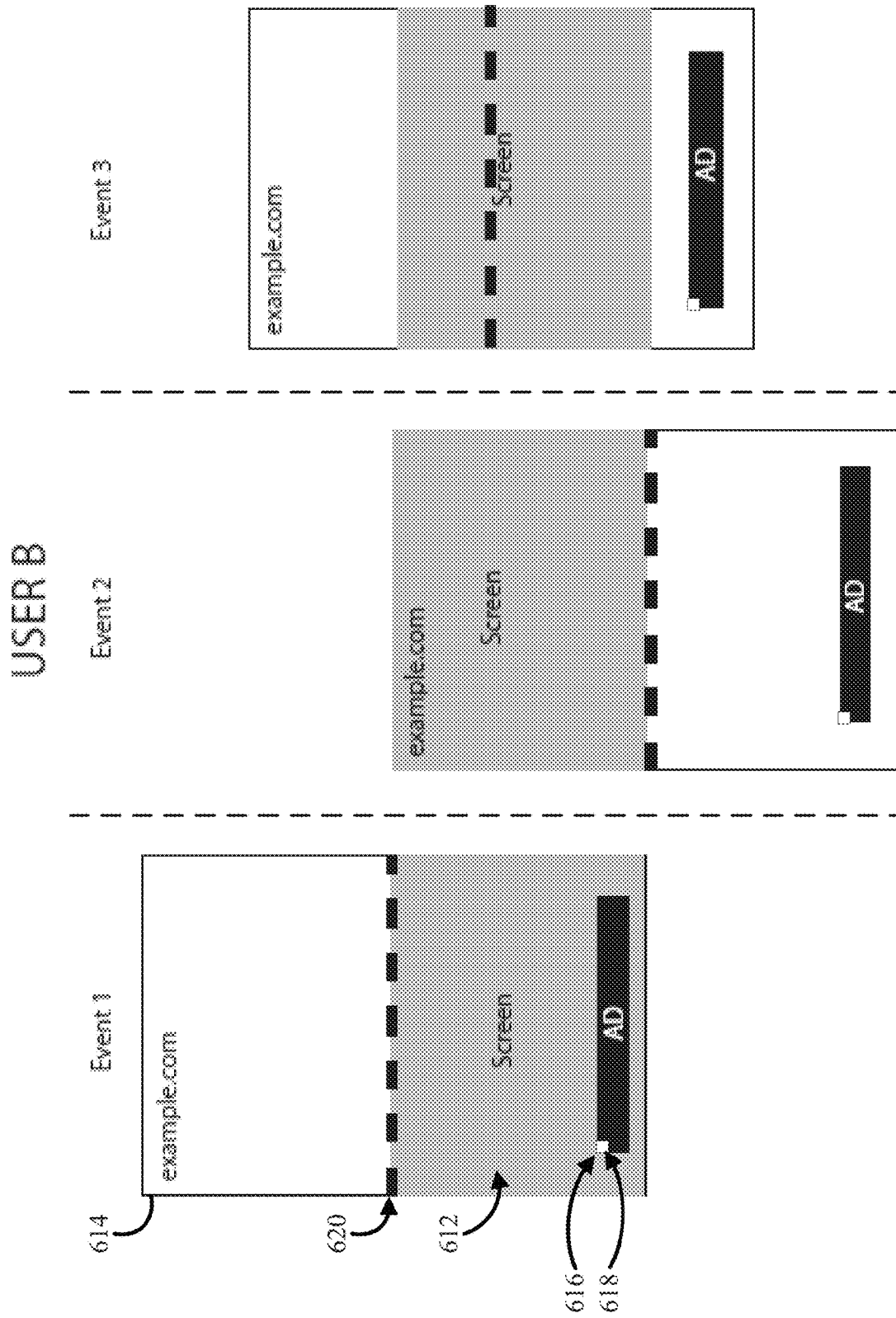

FIG. 6B shows an example of a user, User B, using a browser window having a viewport 612 to view a webpage 614, where three scroll actions on webpage 614 are shown in the example. An advertisement 616 is loaded in webpage 614 with an included animated image file 618. It should be noted that animated image file 618 is not shown in the figures at actual size, but instead is representative of a possible location where an animated image file can be loaded in association with an advertisement. As described above, animated image file 618 can include a 1×1 pixel GIF that is configured to rotate through multiple colors (e.g., four colors every one second).

In this example, an advertisement 616 is "below the fold." Event 1 shows that the user receives a "below the fold" advertisement 616 that appears in viewport 612, where the fold is represented by line 620. However, event 2 and event 3 show that a scroll action towards the top of the webpage causes advertisement 616 to appear outside of viewport 612.

In such an example, a browser application rendering webpage 614 can animate animated image file 618 during event 1 when animated image file 618 is within viewport 616, but inhibit animation of animated image file 618 during events 2 and 3 when animated image file 618 is no longer within viewport 612. For example, the animated image file can rotate through colors as long as the animated image file remains within viewport 612. As another example, the animated image can rotate through colors for a particular period of time (e.g., thirty seconds, two minutes, etc.) while animated image file 618 is within viewport 612. Tracking code that is loaded in association with the animated image file can collect information regarding whether the animated image file is being animated by the browser application, in order to report on the viewability of advertisement 616 with which animated image file 608 is associated. In this case, the tracking code can transmit a report indicating that animated image file 608 was viewable during the duration of event 1, but was not in view at other times.

Figure 6C:
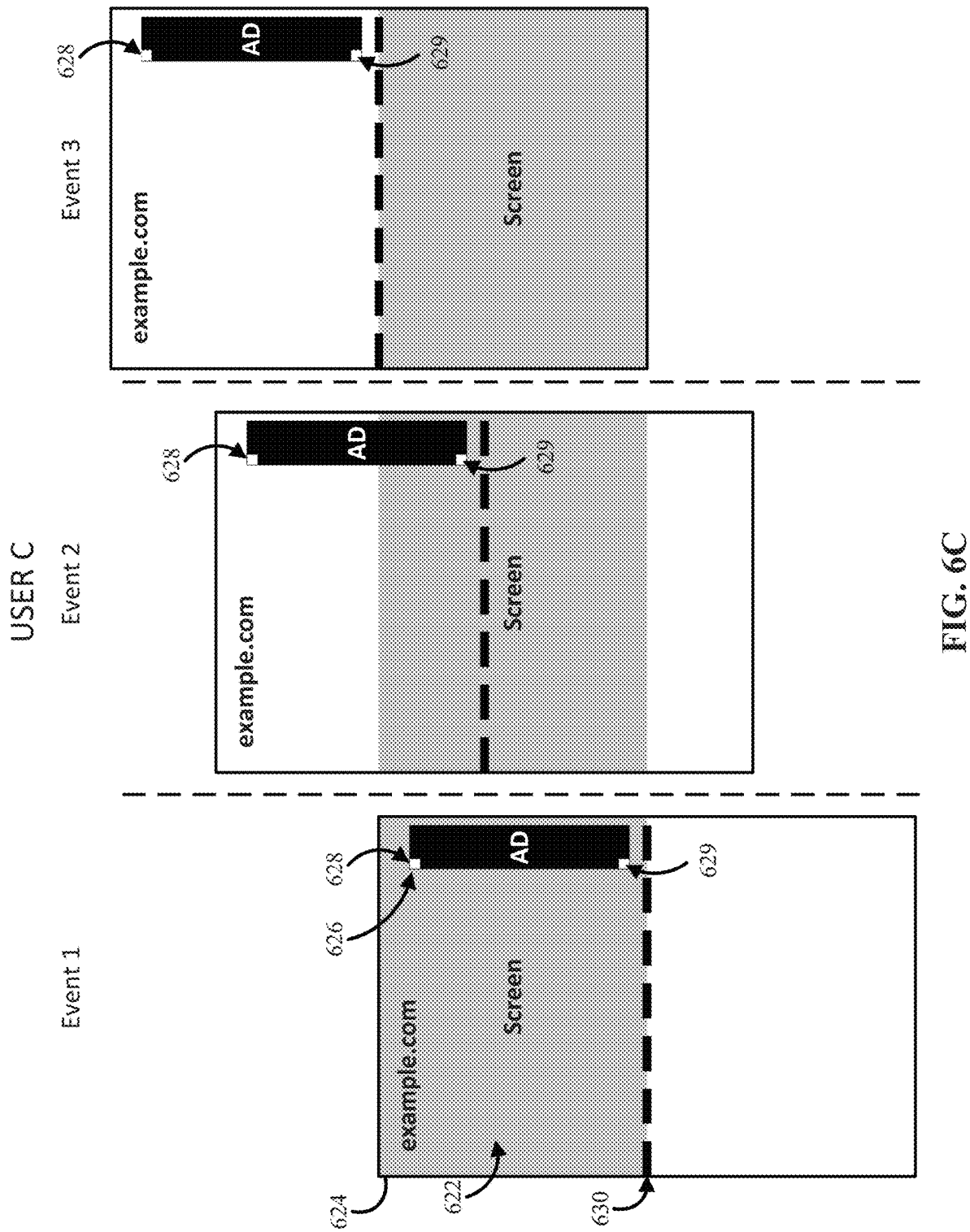

FIG. 6C shows an example of a user, User C, using a browser window having a viewport 622 to view a webpage 624, where three scroll actions on webpage 624 are shown in the example. An advertisement 626 is loaded in webpage 624 with animated image files 628 and 629 included with advertisement 626. It should be noted that animated image files 628 and 629 are not shown in the figures at actual size, but instead are representative of possible locations where animated image files can be loaded in association with an advertisement. As described above, animated image files 628 and 629 can include a 1×1 pixel GIF that is configured to rotate through multiple colors (e.g., four colors every one second).

In this example, an advertisement 626 is "above the fold," where the fold is represented by line 630. Event 1 shows that viewport 622 is aligned with the top of webpage 624, event 2 shows that the user has scrolled to a lower portion of webpage 624, and event 3 shows that the user has scrolled to the bottom of webpage 624. Event 1 is an example of advertisement 626 being in view to the user because it is located completely within viewport 622. Event 2 is an example of advertisement 626 being partially in view because part of advertisement 626 is located within viewport 622, but part of advertisement 626 is located outside of viewport 622. Event 3 is an example of advertisement 626 being out of view because no part of advertisement 626 is located within viewport 622.

In such an example, a browser application rendering webpage 624 can animate animated image files 628 and 629 during event 1 when animated image files 628 and 629 are within viewport 626. However, during event 2, when animated image file 628 is located outside viewport 622 and animated image file 629 is located inside viewport 622, the browser application can animate animated image file 629 and inhibit animation of animated image file 628. During event 3 when neither of animated image files 628 and 629 are within viewport 622, the browser application can inhibit animation of both animated image files. For example, the animated image files 628 and 629 can rotate through colors as long as the animated image file remains within viewport 622. As another example, the animated image files 628 and 629 can rotate through colors for a particular period of time (e.g., thirty seconds, two minutes, etc.) as long as the animated image file remains within viewport 622. Tracking code that is loaded in association with the animated image file can collect information regarding whether the animated image files are being animated by the browser application, in order to report on the viewability of advertisement 626 with which animated image files 628 and 629 are associated. In this case, the tracking code can transmit a report indicating that animated image files 628 and 629 were viewable during the duration of event 1, animated image file 629 was viewable during the duration of event 2, and animated image files 628 and 629 were neither viewable during the duration of event 3.

It should be noted that the placement of animated image files described herein are given as examples and animated image files as described herein can be placed in any suitable location. For example, an animated image file can be placed at each corner of an advertisement to determine whether an entire advertisement is within a viewport. As another example, a one pixel wide border can be provided around an advertisement to determine which portions of an advertisement are within a viewport. Features regarding placements of monitoring pixels for determining viewability are further described, for example, in commonly owned, commonly assigned U.S. patent application Ser. No. 13/614,878, which is hereby incorporated herein by reference in its entirety.

Figure 7:
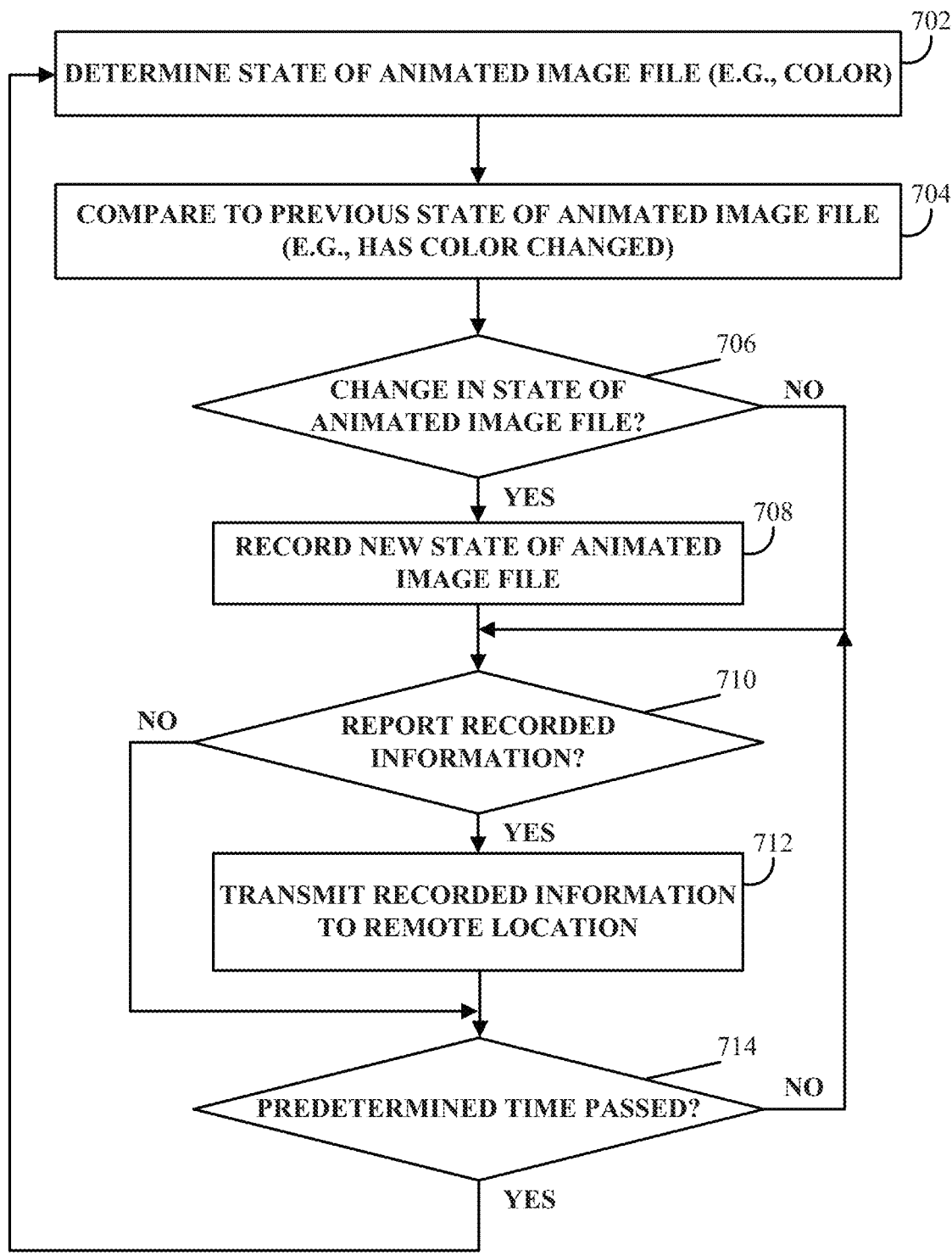
FIG. 7 is a diagram of an illustrative process for detecting content viewability using tracking code in accordance with some embodiments of the disclosed subject matter.

Turning to FIG. 7, an example 700 of a process for tracking a state of an animated image file and reporting the tracked state is shown in accordance with some embodiments of the disclosed subject matter. At 702, tracking code can determine a state of an animated image file contained within content, such as a webpage. Any suitable state of the animated image file can be determined by the tracking code. For example, in some embodiments, as described above, a color of the animated image file can be determined.

At 704, the tracking code can compare the current state of the animated image file determined at 702 to a previously determined state of the animated image file (or a known initial state of the animated image file). For example, the tracking code can compare a current color of the animated image file to a previous color of the animated image file.

At 706, the tracking code can determine whether there was a change in state between a previously determined state and a current state of the animated image file. For example, the tracking code can determine if a current color of the animated image file is different from a previous color of the animated image file.

If the tracking code determines that there was a change in state of the animated image file ("YES" at 706), process 700 can move to 708 where the new state of the animated image file can be recorded. Recording of the state of the animated image file can be performed using any suitable techniques. For example, in some embodiments, the tracking code can record a current state of the animated image file in a cache of a browser that loaded the animated image file. As another example, the tracking code can record a current state of the animated image file in a file designated for temporary storage in a computing device running a browser application that loaded the animated image file. As yet another example, the tracking code can record a current state of the animated image file in any file that the tracking code can access and/or in a file created by the tracking code.

On the other hand, if the tracking code determines that there was a not a change in state of the animated image file ("NO" at 706), process 700 can move to 710.

In some embodiments, the tracking code can record a state of the animated image file regardless of whether there has been a change in state of the animated image file from a previous state. In such embodiments, the tracking code need not compare the current state of the animated image file to a previous state at 704, or determine whether there has been a change at 706.

At 710, the tracking code can determine whether to report information regarding the state of the animated image file that has been recorded at 708. Any suitable techniques can be used to determine whether to report the recorded information. For example, in some embodiments, information recorded by the tracking code can be reported periodically (e.g., at predetermined intervals). As another example, information recorded by the tracking code can be reported when the content associated with the animated image file is navigated away from (e.g., when a browser window where the animated image file was loaded is closed, when a user selects a link to navigate to a different page, when a user closes an application that loaded the animated image file, etc.).

Features regarding reporting and timing for carrying out reporting are further described, for example, in commonly owned, commonly assigned U.S. patent application Ser. No. 13/614,878, which is hereby incorporated herein by reference in its entirety.

If the tracking code determines that the information recorded on the state of the animated image file should be reported ("YES" at 710), process 700 can move to 712 and cause a computing device that loaded the tracking code to transmit the recorded information to a remote location at 712 (e.g., to a data server, a tracking code server, etc.).

Otherwise, if the tracking code determines that the information recorded on the state of the animated image file should not be reported ("NO" at 710), process 700 can move to 714.

At 714, the tracking code can determine whether a predetermined amount of time passed since a state of the animated image file was last determined at 702. The predetermined amount of time can include any suitable amount of time. For example, in some embodiments, the predetermined amount of time can be based on a period at which the animated image file rotates or progresses through states. For instance, if the animated image file rotates through four colors every one second, the tracking code can determine a state of the animated image file eight times per second (or any other suitable number of times per second). This can allow for changes to the state of the animated image file to be determined by checking on a state of the animated image file more often than a period at which the state changes when animated.

If the predetermined amount of time has not passed ("NO" at 714), process 700 can return to 710 to determine whether the recorded information should be reported. Otherwise, if the predetermined amount of time has passed ("YES" at 714), process 700 can return to 702 and determine a state of the animated image file at 702 and/or whether the state has changed at 704 and 706.

Figure 8:
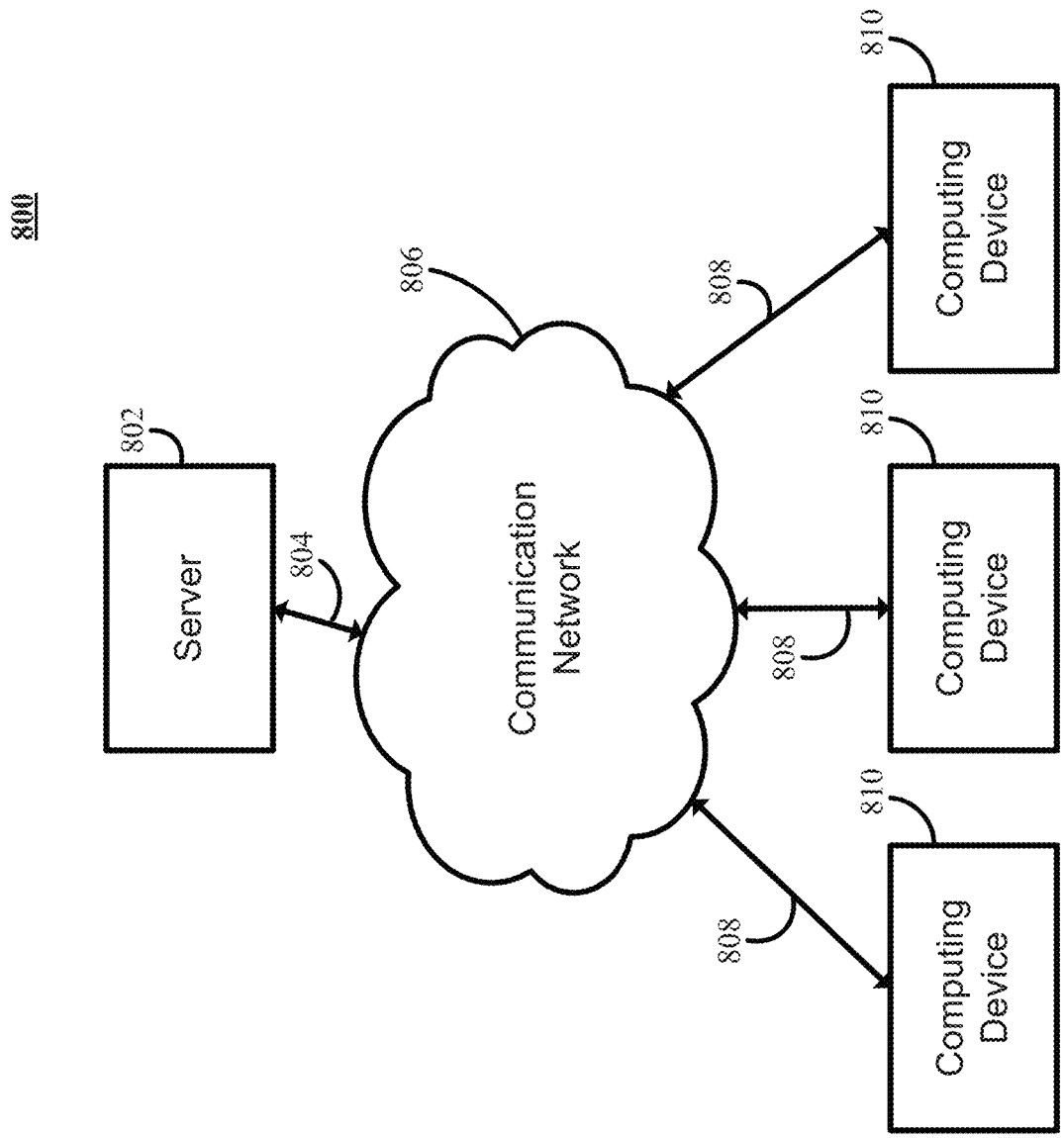
FIG. 8 is a diagram of an illustrative system on which mechanisms for detecting content viewability can be implemented in accordance with some embodiments of the disclosed subject matter.

FIG. 8 shows an example of a generalized schematic diagram of a system 800 on which the mechanisms for detecting content viewability described herein can be implemented as a content viewability application in accordance with some embodiments. As illustrated, system 800 can include one or more computing devices 810. Computing devices 810 can be local to each other or remote from each other. Computing devices 810 can be connected by one or more communication links 808 to a communications network 806 that can be linked via a communication link 806 to a server 802.

System 800 can include one or more servers 802. Server 802 can be any suitable server for providing access to the content viewability application, such as a processor, a computer, a data processing device, or any suitable combination of such devices. For example, the content viewability application can be distributed into multiple backend components and multiple frontend components or interfaces. In a more particular example, backend components, such as data collection and data distribution can be performed on one or more servers 802.

More particularly, for example, each of the computing devices 810 and server 802 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 810 can be implemented as a personal computer, a smartphone, a tablet computer, a personal data assistant (PDA), a multimedia terminal, a mobile telephone, a set-top box, a television, a game console, a digital media receiver, etc.

Communications network 806 can be any suitable computer network or combination of networks including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), etc. Communication links 804 and 808 can be any communication links suitable for communicating data between computing devices 810 and server 802, such as network links, dial-up links, wireless links, hard-wired links, any other suitable communication links, or any suitable combination of such links. Computing devices 810 can, for example, enable a user to load a webpage that causes features of the application to be accessed. Computing devices 810 and server 802 can be located at any suitable location.

Figure 9:
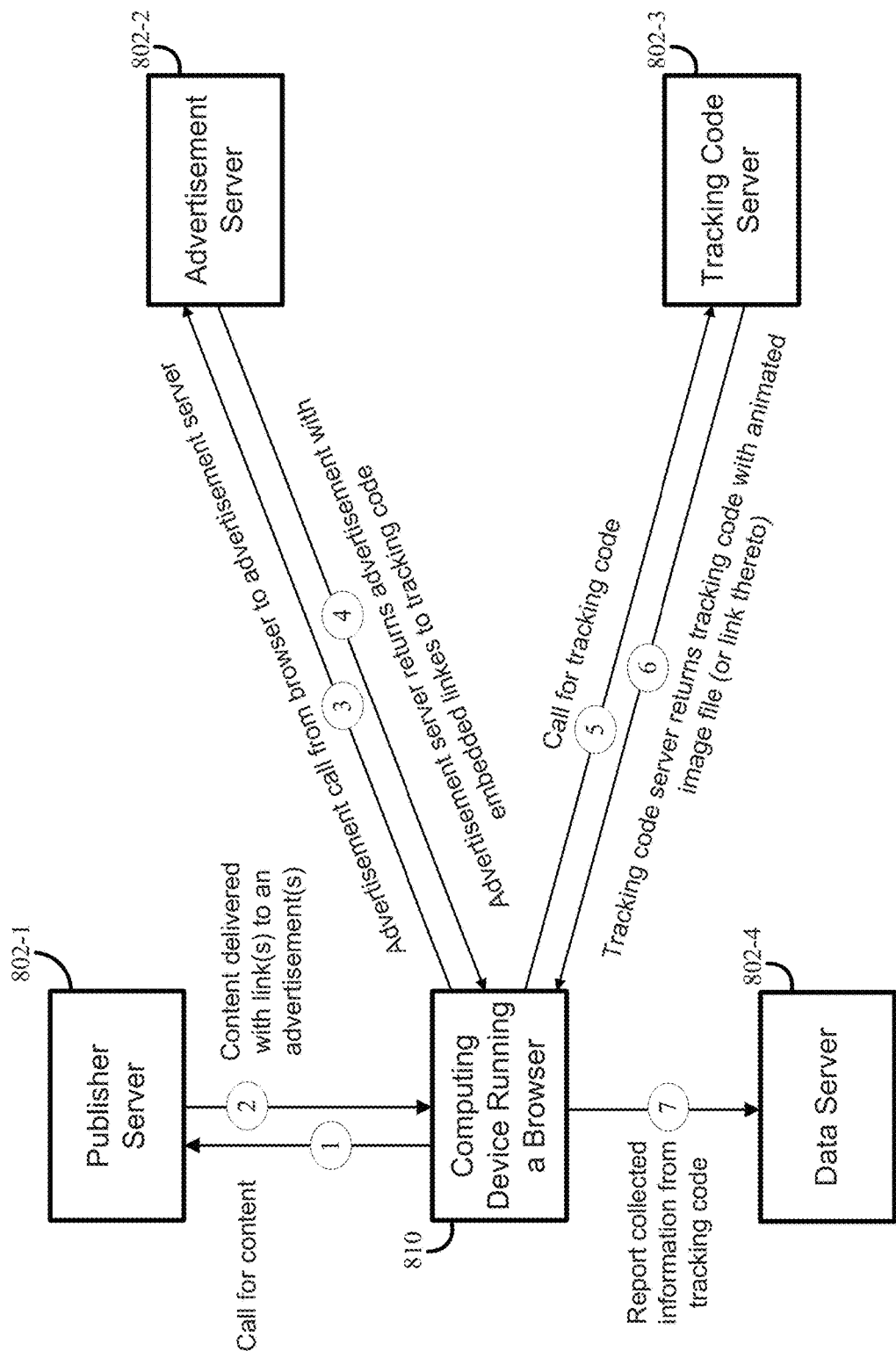
FIG. 9 is a diagram of an illustrative process flow for placing an advertisement and detecting viewability of the advertisement in accordance with some embodiments of the disclosed subject matter.

FIG. 9 shows an example of a process flow for detecting content viewability in accordance with various embodiments. In the example of FIG. 9, a browser application running on a computing device 810 can send a request (1) for content from a publisher server 802-1. For example, a user can enter a URL or an IP address corresponding to a domain of a content publisher or a specific page within the domain of a content publisher in an address portion of the browser application. As another example, the user can be automatically directed to content publisher's server 802-1 by selecting a hyperlink or in response to a redirect from another URL or IP address, or using any other techniques in which a browser running on a user device can be directed to request content from content publisher's server 802-1.

In response to receiving a request for content from the browser application running on computing device 810, publisher server 802-1 can deliver the requested content (2) with link(s) to an advertisement(s) that initiates an advertisement call from the browser application to an advertisement server 802-2. As described above, the content can include instructions that cause the browser application to render the content. The advertisement call can be include in these instructions and can cause the browser application to request an advertisement (3) from advertisement server 802-2. In response to the request for an advertisement, the advertisement server 802-2 returns an advertisement (4) with an embedded link to a tracking code, also referred to herein as the content viewability application.

The browser application running on computing device 810 can then make a call (5) to a tracking code server 802-3 for the tracking code. In response to the call for tracking code, tracking code server 802-3 can return the tracking code (6) with an animated image file (or a link to the animated image file). As described above, the tracking code can include JavaScript that loads an animated image file within the content and collects information about the animated image file. For example, the tracking code can determine whether the advertisement has been viewed or is in view by detecting one of a plurality of colors specified by the animated image file, if the image file is currently animating, how many times a sequence of colors was specified by the animated image file, or the like.

The tracking code can cause computing device 810 to report (7) the collected information to a data server 802-4, which can collect information from various tracking codes and combine that information for use in making advertising decisions, evaluating advertising viewability, etc. Additionally or alternatively, the collected information can be reported back to tracking code server 802-3, or any other suitable location.

Figure 10:
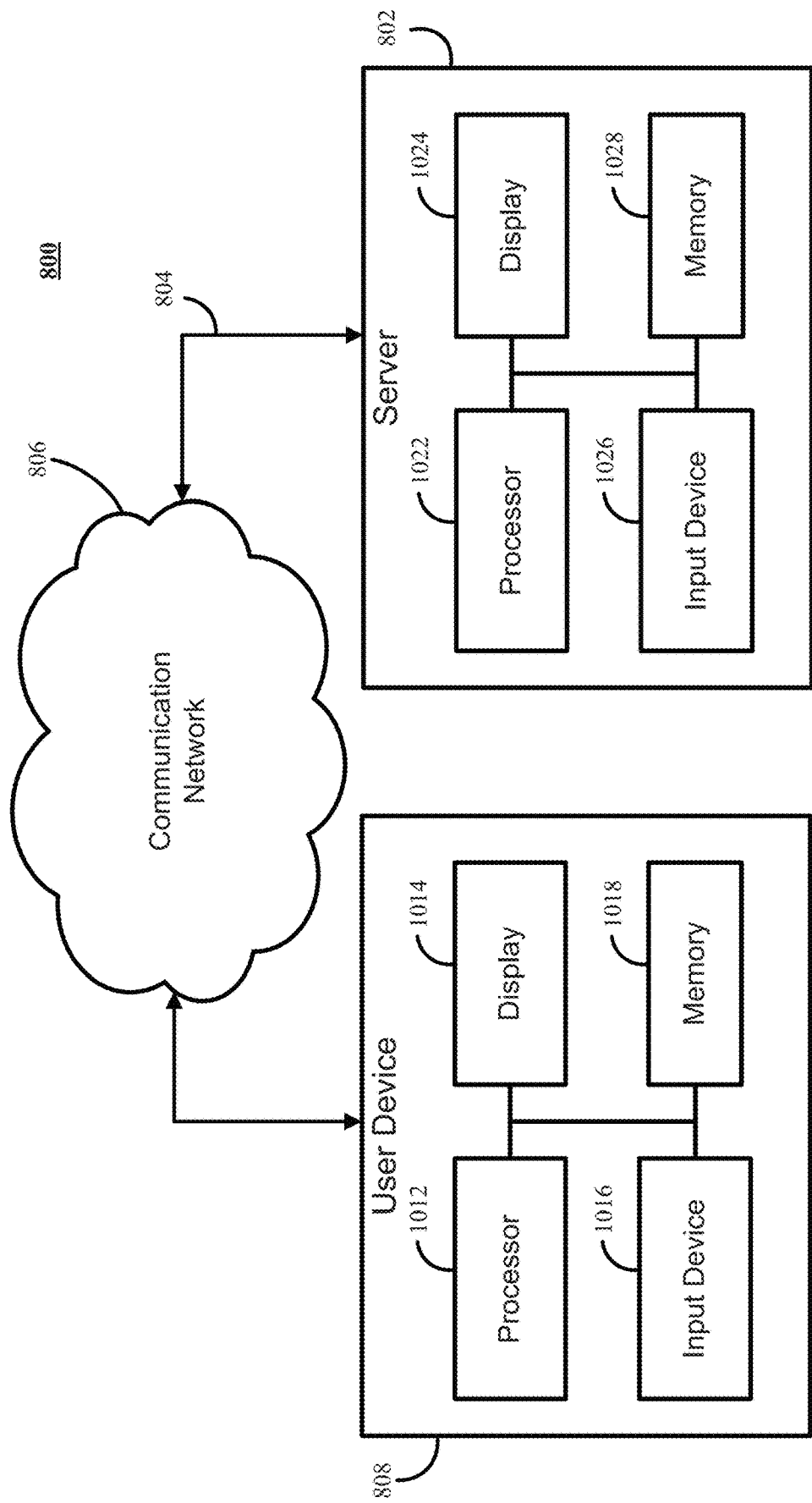
FIG. 10 is a diagram of an illustrative computing device and server as provided, for example, in FIG. 8 in accordance with some embodiments of the disclosed subject matter.

FIG. 10 shows an example of system 800 where the server and one of the computing devices depicted in FIG. 8 are illustrated in more detail. Referring to FIG. 10, user device 810 can include a processor 1012, a display 1014, an input device 1016, and memory 1018, which can be interconnected. In some embodiments, memory 1018 can include a storage device (such as a computer-readable medium) for storing a computer program for controlling processor 1012.

Processor 1012 can use the computer program to present on display 1014 a browser window that loads a webpage with an advertisement and/or other data received through communications link 808 and commands and/or values transmitted by a user of computing device 810. It should also be noted that data received through communications link 808 or any other communications links can be received from any suitable source. Input device 1016 can be a computer keyboard, a cursor-controller, dial, switchbank, lever, touch-screen, or any other suitable input device.

Server 802 can include processor 1022, display 1024, input device 1026, and memory 1028, which can be interconnected. In some embodiments, memory 1028 can include a storage device for storing data received through communications link 804 or through other links, and also receives commands and values transmitted by one or more users. The storage device can further include a server program for controlling processor 1022.

Accordingly, methods, systems, and media for detecting content viewability are provided.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The methods and systems described herein can be deployed in part or in whole through a machine that executes computer software, program codes, and/or instructions on a processor. The processor can be part of a server, cloud server, client, network infrastructure, mobile computing platform, stationary computing platform, or other computing platform. A processor can be any kind of computational or processing device capable of executing program instructions, codes, binary instructions and the like. The processor can be or include a signal processor, digital processor, embedded processor, microprocessor or any variant such as a co-processor (math co-processor, graphic co-processor, communication co-processor and the like) and the like that can directly or indirectly facilitate execution of program code or program instructions stored thereon. In addition, the processor can enable execution of multiple programs, threads, and codes. The threads can be executed simultaneously to enhance the performance of the processor and to facilitate simultaneous operations of the application. By way of implementation, methods, program codes, program instructions and the like described herein can be implemented in one or more thread. The thread can spawn other threads that can have assigned priorities associated with them; the processor can execute these threads based on priority or any other order based on instructions provided in the program code. The processor can include memory that stores methods, codes, instructions and programs as described herein and elsewhere. The processor can access a storage medium through an interface that can store methods, codes, and instructions as described herein and elsewhere. The storage medium associated with the processor for storing methods, programs, codes, program instructions or other type of instructions capable of being executed by the computing or processing device can include but can not be limited to one or more of a CD-ROM, DVD, memory, hard disk, flash drive, RAM, ROM, cache and the like.

A processor can include one or more cores that can enhance speed and performance of a multiprocessor. In embodiments, the process can be a dual core processor, quad core processors, other chip-level multiprocessor and the like that combine two or more independent cores (called a die).

The methods and systems described herein can be deployed in part or in whole through a machine that executes computer software on a server, client, firewall, gateway, hub, router, or other such computer and/or networking hardware. The software program can be associated with a server that can include a file server, print server, domain server, internet server, intranet server and other variants such as secondary server, host server, distributed server and the like. The server can include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere can be executed by the server. In addition, other devices required for execution of methods as described in this application can be considered as a part of the infrastructure associated with the server.

The server can provide an interface to other devices including, without limitation, clients, other servers, printers, database servers, print servers, file servers, communication servers, distributed servers, social networks, and the like. Additionally, this coupling and/or connection can facilitate remote execution of program across the network. The networking of some or all of these devices can facilitate parallel processing of a program or method at one or more location without deviating from the scope of the invention. In addition, any of the devices attached to the server through an interface can include at least one storage medium capable of storing methods, programs, code and/or instructions. A central repository can provide program instructions to be executed on different devices. In this implementation, the remote repository can act as a storage medium for program code, instructions, and programs.

The software program can be associated with a client that can include a file client, print client, domain client, internet client, intranet client and other variants such as secondary client, host client, distributed client and the like. The client can include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere can be executed by the client. In addition, other devices required for execution of methods as described in this application can be considered as a part of the infrastructure associated with the client.

The client can provide an interface to other devices including, without limitation, servers, cloud servers, other clients, printers, database servers, print servers, file servers, communication servers, distributed servers and the like. Additionally, this coupling and/or connection can facilitate remote execution of program across the network. The networking of some or all of these devices can facilitate parallel processing of a program or method at one or more location without deviating from the scope of the invention. In addition, any of the devices attached to the client through an interface can include at least one storage medium capable of storing methods, programs, applications, code and/or instructions. A central repository can provide program instructions to be executed on different devices. In this implementation, the remote repository can act as a storage medium for program code, instructions, and programs.

The methods and systems described herein can be deployed in part or in whole through network infrastructures. The network infrastructure can include elements such as computing devices, servers, cloud servers, routers, hubs, firewalls, clients, personal computers, communication devices, routing devices and other active and passive devices, modules and/or components as known in the art. The computing and/or non-computing device(s) associated with the network infrastructure can include, apart from other components, a storage medium such as flash memory, buffer, stack, RAM, ROM and the like. The processes, methods, program codes, instructions described herein and elsewhere can be executed by one or more of the network infrastructural elements.

The methods, program codes, and instructions described herein and elsewhere can be implemented on a cellular network having multiple cells. The cellular network can either be frequency division multiple access (FDMA) network or code division multiple access (CDMA) network. The cellular network can include mobile devices, cell sites, base stations, repeaters, antennas, towers, and the like. The cell network can be a GSM, GPRS, 3G, EVDO, LTE, mesh, or other networks types.

The methods, programs codes, and instructions described herein and elsewhere can be implemented on or through mobile devices. The mobile devices can include navigation devices, cell phones, mobile phones, mobile personal digital assistants, laptops, palmtops, netbooks, pagers, electronic books readers, music players and the like. These devices can include, apart from other components, a storage medium such as a flash memory, buffer, RAM, ROM and one or more computing devices. The computing devices associated with mobile devices can be enabled to execute program codes, methods, and instructions stored thereon. Alternatively, the mobile devices can be configured to execute instructions in collaboration with other devices. The mobile devices can communicate with base stations interfaced with servers and configured to execute program codes. The mobile devices can communicate on a peer to peer network, mesh network, or other communications network. The program code can be stored on the storage medium associated with the server and executed by a computing device embedded within the server. The base station can include a computing device and a storage medium. The storage device can store program codes and instructions executed by the computing devices associated with the base station.

The computer software, program codes, and/or instructions can be stored and/or accessed on machine readable media that can include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein can transform physical and/or or intangible items from one state to another. The methods and systems described herein can also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof can be implemented on machines through computer executable media having a processor capable of executing program instructions stored thereon as a monolithic software structure, as standalone software modules, or as modules that employ external routines, code, services, and so forth, or any combination of these, and all such implementations can be within the scope of the present disclosure. Examples of such machines can include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component can be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above can be varied, and that the order of steps can be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, can be realized in hardware, software or any combination of hardware and software suitable for a particular application. The hardware can include a general purpose computer and/or dedicated computing device or specific computing device or particular aspect or component of a specific computing device. The processes can be realized in one or more microprocessors, microcontrollers, embedded microcontrollers, programmable digital signal processors or other programmable device, along with internal and/or external memory. The processes can also, or instead, be embodied in an application specific integrated circuit, a programmable gate array, programmable array logic, or any other device or combination of devices that can be configured to process electronic signals. It will further be appreciated that one or more of the processes can be realized as a computer executable code capable of being executed on a machine readable medium.

The computer executable code can be created using a structured programming language such as C, an object oriented programming language such as C++, or any other high-level or low-level programming language (including assembly languages, hardware description languages, and database programming languages and technologies) that can be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof can be embodied in computer executable code that, when executing on one or more computing devices, performs the steps thereof. In another aspect, the methods can be embodied in systems that perform the steps thereof, and can be distributed across devices in a number of ways, or all of the functionality can be integrated into a dedicated, standalone device or other hardware. In another aspect, the means for performing the steps associated with the processes described above can include any of the hardware and/or software described above. All such permutations and combinations are intended to fall within the scope of the present disclosure.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

All documents referenced herein are hereby incorporated by reference.

What is claimed:

1. A method for detecting viewability, the method comprising:
   intercepting, using at least one hardware processor, an advertisement call, which was redirected from transmission between a computing device and an advertisement server, to serve an advertisement in an advertising region;
   selecting, using the at least one hardware processor, tracking code from a plurality of types of tracking codes based on an animated image file used to determine whether the advertisement in the advertising region is viewable, wherein the tracking code is configured to monitor states of the animated image file that is loaded in association with the advertisement using a tracking technique;
   inserting, using the at least one hardware processor, code into the advertisement call, where the code renders the animated image file and wherein the code executes the tracking code to monitor states of the animated image file;
   transmitting, using the at least one hardware processor, the advertisement with the inserted code to the computing device, wherein the tracking code within inserted code returns states of the animated image file; and
   determining, using the at least one hardware processor, whether the advertisement is viewable based on the returned state of the animated image file.

2. The method of claim 1, further comprising generating a plurality of animated image files that are each configured to rotate through a sequence of different colors over a predetermined time period.

3. The method of claim 2, wherein each of the plurality of animated image files begins animating by rotating through the sequence of different colors upon being displayed within a viewable region of a viewport and ceases animating upon not being displayed within the viewable region of the viewport.

4. The method of claim 3, wherein each color in the sequence of different colors is associated with a time from a start time at which an animated image file began animating.

5. The method of claim 2, wherein the inserted code renders each of the plurality of animated image files in one of a plurality of different positions adjacent to the advertisement in the advertising region.

6. The method of claim 5, wherein the inserted code causes the plurality of animated image files to be rendered in the plurality of different positions adjacent to the advertising region.

7. The method of claim 6, wherein, in response to detecting that a first animated image file of the plurality of animated image files is currently being displayed within a viewable region of a viewport, the first animated image files is caused to rotate through the sequence of different colors over the predetermined time period.

8. The method of claim 7, wherein, in response to detecting that a second animated image file of the plurality of animated image files is not currently being displayed within the viewable region of the viewport, the second animated image file is caused to cease rotating through the sequence of different colors.

9. The method of claim 2, wherein the method further comprises retrieving, from the computing device using the tracking code, at a first sampling time, color information corresponding to at least a first portion of the plurality of animated image files.

10. The method of claim 9, wherein the method further comprises retrieving, from the computing device using the tracking code, at a second sampling time, color information corresponding to at least a second portion of the plurality of animated image files, wherein the second portion of the plurality of animated image files is different than the first portion of the plurality of animated image files.

11. The method of claim 10, wherein the advertisement is determined to be viewable based on the received color information from the first portion of the plurality of animated image files and the received color information from the second portion of the plurality of animated image files and based on the time associated with colors associated with each of the plurality of animated image files.

12. The method of claim 11, wherein the method further comprises transmitting, to the advertisement server, viewability information corresponding to the advertisement based on the determination.

13. The method of claim 2, wherein the advertisement call to serve an advertisement is received from the computing device running an application that loaded a page and wherein the method further comprises using the tracking code to determine a color of each of the plurality of animated image files.

14. The method of claim 13, further comprising transmitting information determined by the tracking code to a remote site that is different from a content provider associated with the page.

15. The method of claim 2, wherein each of the plurality of animated image files is formatted in Graphics Interchange Format (GIF).

16. The method of claim 2, wherein determining whether the advertisement is viewable further comprises comparing a current detected state of each of the plurality of animated image files to a previously detected state of each of the plurality of animated image files.

17. The method of claim 2, wherein the method further comprises:
receiving a request to serve a plurality of advertisements, wherein the content and the plurality of advertisements are displayed within a window; and
assigning a copy of each of the plurality of animated image files to each of the plurality of advertisements, wherein each of the plurality of animated image files changes between the plurality of states upon detecting that the associated advertisement is displayed within the viewable region of the window.

18. A system for detecting content viewability, the system comprising:
at least one hardware processor that is configured to:
intercept an advertisement call, which was redirected from transmission between a computing device and an advertisement server, to serve an advertisement in an advertising region;
select tracking code from a plurality of types of tracking codes based on an animated image file used to determine whether the advertisement in the advertising region is viewable, wherein the tracking code is configured to monitor states of the animated image file that is loaded in association with the advertisement using a tracking technique;
insert code into the advertisement call, where the code renders the animated image file and wherein the code executes the tracking code to monitor states of the animated image file;
transmit the advertisement with the inserted code to the computing device, wherein the tracking code within inserted code returns states of the animated image file; and
determine whether the advertisement is viewable based on the returned state of the animated image file.

19. A non-transitory computer-readable medium containing computer-executable instructions that, when executed by a processor, cause the processor to perform a method for detecting content viewability, the method comprising:
intercepting, using at least one hardware processor, an advertisement call, which was redirected from transmission between a computing device and an advertisement server, to serve an advertisement in an advertising region;
selecting, using the at least one hardware processor, tracking code from a plurality of types of tracking codes based on an animated image file used to determine whether the advertisement in the advertising region is viewable, wherein the tracking code is configured to monitor states of the animated image file that is loaded in association with the advertisement using a tracking technique;
inserting, using the at least one hardware processor, code into the advertisement call, where the code renders the animated image file and wherein the code executes the tracking code to monitor states of the animated image file;
transmitting, using the at least one hardware processor, the advertisement with the inserted code to the computing device, wherein the tracking code within inserted code returns states of the animated image file; and
determining, using the at least one hardware processor, whether the advertisement is viewable based on the returned state of the animated image file.

* * * * *